(12) United States Patent
Shibata et al.

(10) Patent No.: US 8,331,389 B2
(45) Date of Patent: Dec. 11, 2012

(54) RELAY DEVICE AND BAND CONTROLLING METHOD

(75) Inventors: Masashi Shibata, Fukuoka (JP); Kouki Kurokawa, Fukuoka (JP); Atsuyoshi Koga, Fukuoka (JP); Yoshinari Sugimoto, Fukuoka (JP); Nobuyuki Iwasaki, Fukuoka (JP); Kazuaki Yoshida, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/260,164

(22) Filed: Oct. 29, 2008

(65) Prior Publication Data

US 2009/0122806 A1    May 14, 2009

(30) Foreign Application Priority Data

Nov. 12, 2007    (JP) .................................. 2007-293231

(51) Int. Cl.
*H04L 12/28* (2006.01)
(52) U.S. Cl. ... 370/419; 370/351; 370/389; 370/395.21; 370/395.41; 370/396; 370/412
(58) Field of Classification Search .................. 370/351, 370/389, 395.21, 395.41, 396, 412, 419
See application file for complete search history.

(56) References Cited

U.S. PATENT DOCUMENTS

| 6,324,165 | B1* | 11/2001 | Fan et al. ....................... 370/232 |
| 6,388,993 | B1* | 5/2002 | Shin et al. ...................... 370/233 |
| 6,856,595 | B1* | 2/2005 | Brown ........................... 370/229 |
| 2002/0141423 | A1* | 10/2002 | Namihira ........................ 370/411 |
| 2005/0157728 | A1* | 7/2005 | Kawano et al. .......... 370/395.21 |
| 2005/0276263 | A1* | 12/2005 | Suetsugu et al. ............... 370/389 |
| 2007/0053296 | A1* | 3/2007 | Yazaki et al. .................. 370/235 |
| 2009/0180380 | A1* | 7/2009 | Prabhakar et al. ............. 370/232 |

FOREIGN PATENT DOCUMENTS

JP    2005-260430    9/2005

* cited by examiner

*Primary Examiner* — Hassan Phillips
*Assistant Examiner* — Gautam Sharma
(74) *Attorney, Agent, or Firm* — Katten Muchin Rosenman LLP

(57) ABSTRACT

A relay device has a plurality of input/output modules each having input/output ports, each input/output module including throughput measuring means for measuring throughput of communication packets received from other input/output modules, and throughput limiting means for limiting throughput of communication packets to be transferred to the other input/output modules on the basis of the throughput measured by the throughput measuring means, wherein the relay device transfers communication packets between the input/output modules to relay the communication packets.

10 Claims, 8 Drawing Sheets

| FLOW NUMBER | IN-DEVICE CLASS | PACKET LENGTH INFORMATION |

RELAY DEVICE AND BAND CONTROLLING METHOD

CROSS-REFERENCES TO RELATED APPLICATIONS

This application is based upon and claims the benefit of priority of the prior Japanese Application No. 2007-293231, filed on Nov. 12, 2007, the entire contents of which are incorporated herein by reference.

BACKGROUND OF THE INVENTION

1. Field

The invention relates to relay devices that have a plurality of input/output modules each including input/output ports and that relay communication packets by transferring the communication packets between the input/output modules, and to band controlling methods for controlling the relay devices. More particularly, the invention relates to a relay device capable of realizing band control without complication of a configuration and to a band controlling method.

2. Description of the Related Art

Recently, to realize provision of stable network services, relay devices, such as routers and network switches, include a band controlling function for controlling a band for each network service or each user. For example, Japanese Unexamined Patent Application Publication No. 2005-260430 discloses a technique for temporarily storing communication packets in an output queue provided for each output (transmission) port to perform band control based on an amount of the accumulated communication packets.

Meanwhile, some relay devices have a configuration that allows the number of input/output modules having a plurality of ports to be freely increased or decreased so that the configuration of the device can be flexibly changed according to the increase or decrease in the necessary number of ports. When the technique disclosed in Japanese Unexamined Patent Application Publication No. 2005-260430 is applied to such relay devices, a path for informing another input/output module of an amount of communication packets accumulated in each output queue is needed, which undesirably complicates the configuration.

SUMMARY

This invention is made to solve the above-described problem involving the related art. It is an object of the invention to provide a relay device capable of realizing band control without complication of a configuration even if the device has a plurality of input/output modules, and to provide a band controlling program.

To solve the above-described problem and achieve the above-described object, according to an aspect of an embodiment, a relay device comprises a plurality of input/output modules each having input/output ports. Each input/output module includes throughput measuring means for measuring throughput of communication packets transferred from other input/output modules, and throughput limiting means for limiting throughput of communication packets to be transferred to the other input/output modules on the basis of the throughput measured by the throughput measuring means. The relay device transfers communication packets between the input/output modules to relay the communication packets.

Additional objects and advantages of the embodiment will be set forth in part in the description which follows, and in part will be obvious from the description, or may be learned by practice of the invention.

The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF THE PREFERRED EMBODIMENTS

Preferred embodiments of a relay device and a band controlling program according to the invention will be described in detail below with reference to the accompanying drawings.

Figure 1:
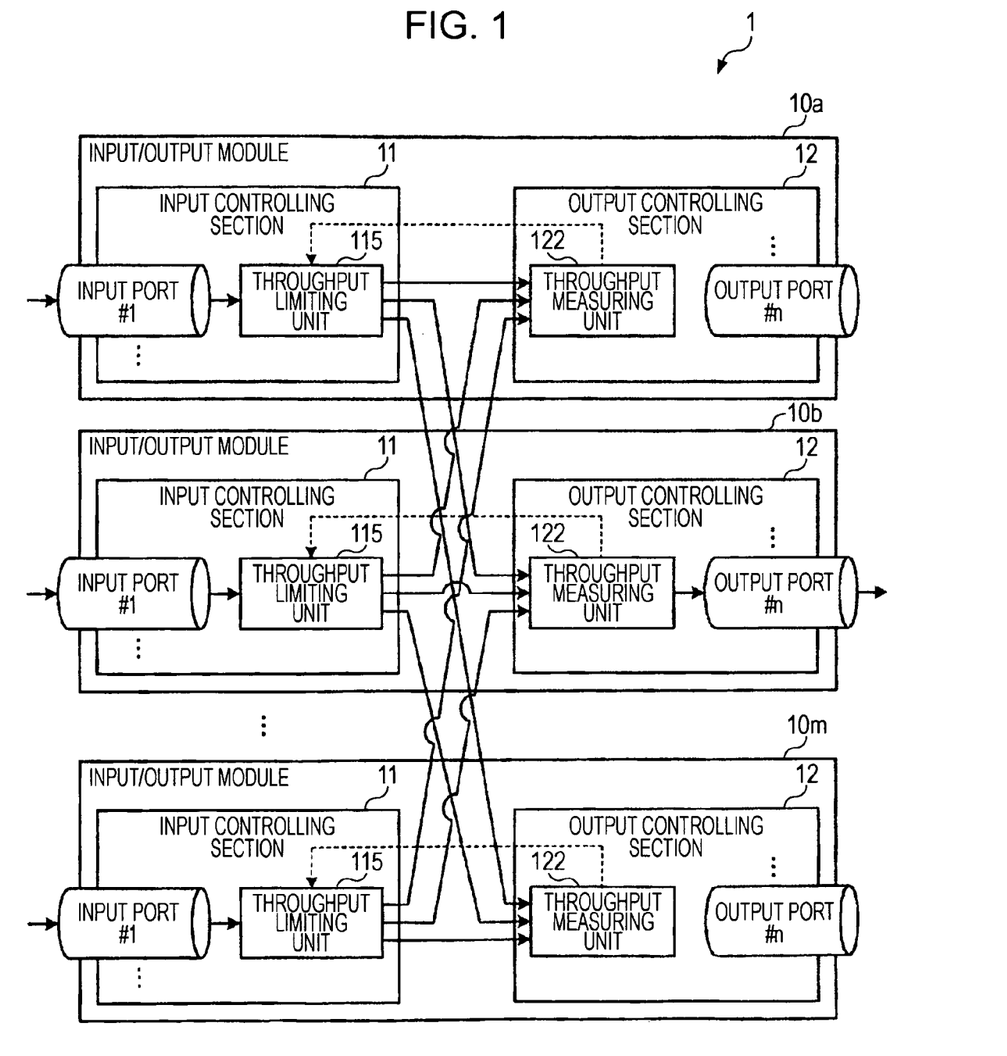
FIG. 1 is a diagram showing an overview of a band controlling method according to an embodiment.

First, an overview of a band controlling method according to an embodiment will be described. FIG. 1 is a diagram showing an overview of a band controlling method according to the embodiment. A relay device 1 shown in the drawing executes the band controlling method according to the embodiment. The relay device 1 includes a plurality of input/output modules, namely, input/output modules $10a$-$10m$ (hereinafter, a term "input/output module 10" is used as a generic term for each of the input/output modules $10a$-$10m$). The input/output modules $10a$-$10m$ relay communication packets. A necessary line accommodation capacity can be obtained by mounting a necessary number of input/output modules 10 in a relay device 10.

The input/output module 10 includes an input controlling section 11 responsible for reception of communication packets and an output controlling section 12 responsible for transmission of communication packets. The input controlling section 11 of each input/output module 10 can transfer communication packets to the output controlling section 12 of each input/output module 10. More specifically, the input/output module $10a$ can transfer communication packets to the output controlling section 12 of each of the input/output modules $10a$-$10m$. The other input/output modules can also transfer communication packets to the output controlling section 12 of each of the input/output modules $10a$-$10m$.

The input controlling section 11 includes a plurality of input ports for receiving communication packets transmitted from outside of the relay device 1 and a throughput limiting unit 115 for limiting throughput of packets received by each input port. The output controlling section 12 has a plurality of output ports for transmitting communication packets outside of the relay device 1 and a throughput measuring unit 122 for measuring the throughput of communication packets transferred to the output controlling section 12.

The relay device 1 combines ports of given input/output modules 10 to make up groups and can perform band control for each group. Here, an input port #1 of the input/output module 10a, an input port #1 of the input/output module 10b, and an input port #1 of the input/output module 10m constitute Group A. Communication packets received by these input ports #1 are transmitted from an output port #n of the input/output module 10b. In addition, a band assigned to Group A is controlled so that the throughput does not exceed a band of a line connected to the output port #n of the input/output port 10b.

To establish the band control, the input controlling section 11 of each input/output module 10 transfers communication packets received from outside of the relay device 1 to the output controlling sections 12 of all of the input/output modules 10. The throughput measuring unit 122 of the output controlling section 12 measures throughput of the transferred communication packets for each group. Transfer of the received communication packets to all of the output controlling sections 12 in this manner permits each throughput measuring unit 122 to grasp the throughput of the communication packets received by each input port belonging to Group A.

Each throughput measuring unit 122 then feeds information regarding throughput obtained by subtracting throughput transferred from the input controlling section 11 of the same input/output module 10 from the measured throughput back to the throughput limiting unit 115 of the input controlling section 11 of the same input/output module 10. The throughput measuring unit 122 feeds the throughput information back to the throughput limiting unit 115 of the same input/output module 10 in this manner, whereby the throughput limiting unit 115 can grasp the throughput of the communication packets transferred by the other input/output modules 10.

The throughput limiting unit 115 limits throughput of communication packets transferred within the same input/output module 10 on the basis of the feedback information so that the sum of the throughput of communication packets transferred within the same input/output module 10 and the throughput of communication packets transferred by the other input/output modules 10 does not exceed a predetermined value. For example, when throughput of 100 Mbps is assigned to Group A, and the information fed back to the throughput limiting unit 115 of the input/output module 10a indicates that the other input/output modules 10 are transferring communication packets received by the input ports belonging to Group A at 80 Mbps, the throughput limiting unit 115 of the input/output module 10a limits the throughput of the communication packets received by the input port of the input/output module 10a belonging to Group A to 20 Mbps.

The communication packets received by each input port belonging to Group A are discarded by the output controlling sections 12 of the input/output modules 10a and 10m after the throughput measuring units 122 measure the throughput, and are transmitted only from the output port #n of the input/output module 10b.

As described above, in the band controlling method according to the embodiment, communication packets received by one input/output module 10 are transferred to all of the input/output modules 10 included in the relay device 1, and each of the input/output modules 10 autonomously measures and limits the throughput, thus establishing the band control. Since a path for transferring the communication packets between the input/output modules 10 is originally used for relaying the communication packets, and since the band controlling method according to the embodiment does not require a path for exchanging information between the input/output modules 10 except for the communication-packet transferring path, the configuration of the device can be simplified.

In addition, since the band controlling method according to the embodiment permits each input/output module 10 to establish band control through an autonomous operation, trouble is not caused in the band control even if some of the input/output modules 10 go out of order. Thus, a high reliability can be realized.

Figure 2:
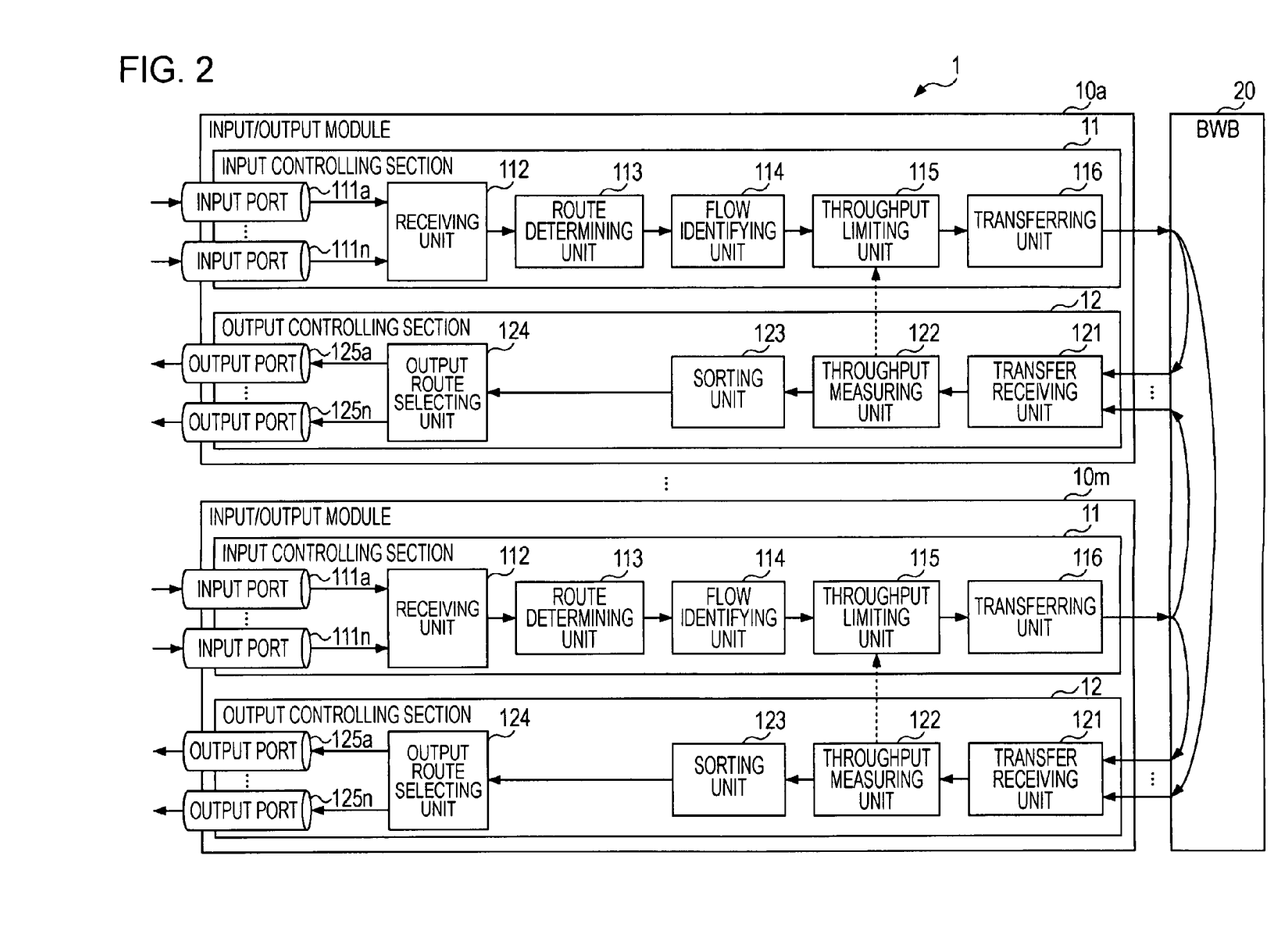
FIG. 2 is a block diagram showing a configuration of a relay device according to an embodiment.

A configuration of the relay device 1 shown in FIG. 1 will now be described in detail. FIG. 2 is a block diagram showing a configuration of the relay device 1. As shown in the drawing, the relay device 1 includes the input/output modules 10a-10m and a back wired board (BWB) 20. The input/output modules 10a-10m are for transmitting and receiving communication packets and the number of modules can be increased or decreased. The BWB 20 is electrically connected to the input/output modules 10a-10m. The BWB 20 connects each of the input/output modules 10 like a mesh so that communication packets are transferred within the relay device 1.

As described above, an input/output module 10 includes the input controlling section 11 and the output controlling section 12. The input controlling section 11 includes input ports 111a-111n, a receiving unit 112, a route determining unit 113, a flow identifying unit 114, a throughput limiting unit 115, and a transferring unit 116. The output controlling section 12 includes a transfer receiving unit 121, a throughput measuring unit 122, a sorting unit 123, an output route selecting unit 124, and output ports 125a-125n.

The receiving unit 112 is a processing unit for receiving communication packets through interfaces, namely, the input ports 111a-111n. The route determining unit 113 is a processing unit for determining an output route of communication packets on the basis of a destination address or the like set in the communication packets, and for attaching internal header information, which includes information on the determined route, to the communication packets.

In addition, the route determining unit 113 classifies the communication packets into a given class based on a transmission/reception address or a port number included in a TCP header for the purpose of quality of service (QoS) control. For example, the route determining unit 113 may classify a communication packet having a value 80 (indicating the HTTP service) as the port number of the TCP header into class "20" on the basis of previously set definition information. The route determining unit 113 may also classify a communication packet having a specific MAC address or IP address into class "30." The port number of the TCP header may indicate types of network services utilizing the communication packet, whereas the transmission/reception address may indicate a user transmitting/receiving the communication packet.

Figure 3:
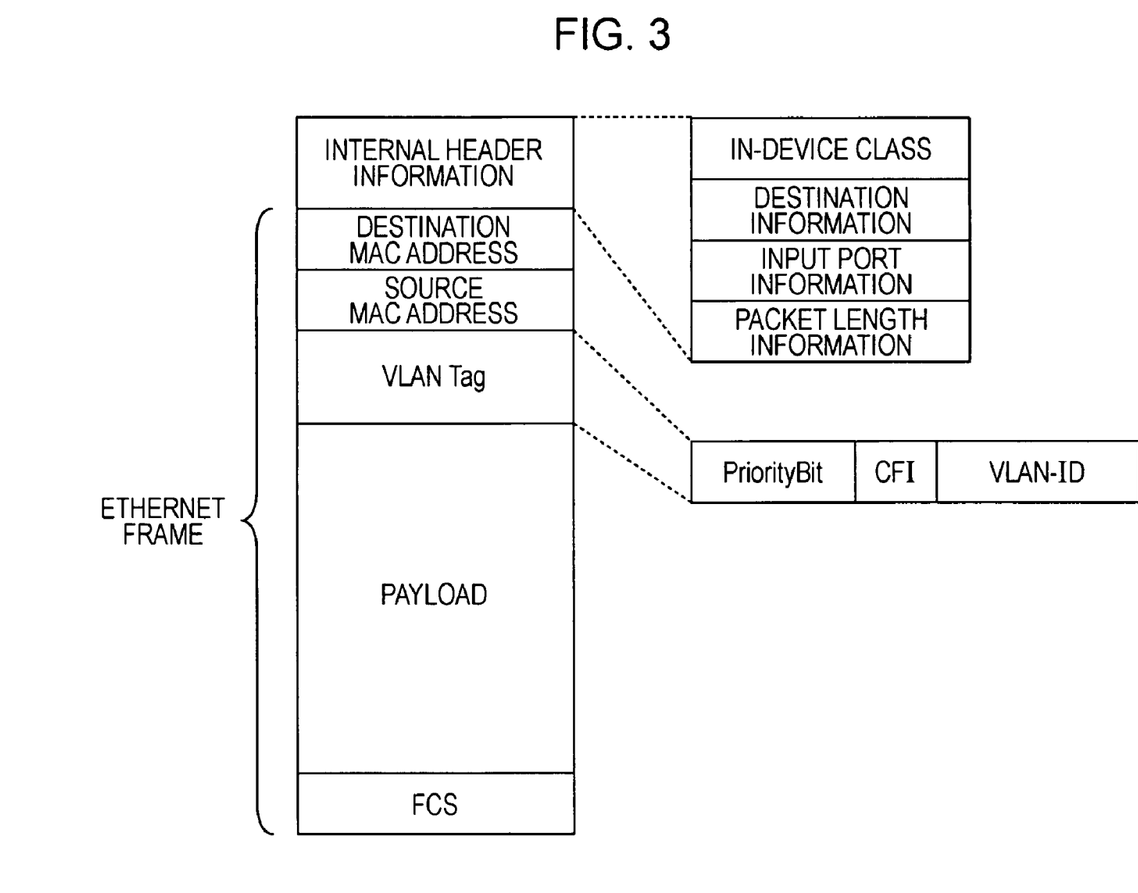
FIG. 3 is a diagram showing a structure of a communication packet to be transferred in a relay device.

Now, an example structure of a communication packet to be transferred in the relay device 1 is shown in FIG. 3. FIG. 3 shows an example of an Ethernet® frame including internal header information attached by the route determining unit 113. In this example, the internal header information includes in-device class information, destination information, input port information, and packet length information.

The in-device class indicates a class into which the communication packet is classified based on the transmission/reception address or the port number of the TCP header that exists in a payload. The destination information indicates a route, such as an output port of an input/output module 10 outputting the communication packet. The input port information indicates an input port of an input/output module 10 having received the communication packet. The packet length information indicates a length of the communication packet excluding the internal header information.

Referring back to FIG. 2, the flow identifying unit 114 is a processing unit for identifying a flow to which the communication packet belongs. A flow is a unit on which the band control is performed. The flow identifying unit 114 compares various kinds of information, such as a VLAN-ID of a VLAN tag and internal header information, with previously set flow definition information, thereby identifying a flow to which the communication packet belongs.

For example, if there is a definition that communication packets received by the input port 111a of the input/output module 10a or the input port 111a of the input/output module 10m are identified to belong to a flow specified by a flow number "1," the flow identifying unit 114 identifies that communication packets having information regarding these input ports at the input port information of the internal header information belong to the flow specified by the flow number "1."

In addition, when there is a definition that communication packets having a VLAN-ID of "100" are identified to belong to a flow specified by a flow number "2," the identifying unit 114 identifies that communication packets having the value "100" at the VLAN-ID of the VLAN tag belong to the flow specified by the flow number "2."

Additionally, when there is a definition that communication packets belonging to a class "90" are identified to belong to a flow specified by a flow number "3," the flow identifying unit 114 identifies that communication packets having a value "90" in the in-device class information of the internal header information belong to the flow specified by the flow number "3."

Although an example of identifying the flow based on a single condition has been described above, the flow identifying unit 114 may identify the flow based on a plurality of conditions. For example, the flow identifying unit 114 may identify the flow using a combination of the output port and the class as the conditions.

The throughput limiting unit 115 is a processing unit for limiting throughput of communication packet for each flow identified by the flow identifying unit 114. Definition of identification of each flow and setting of a limit throughput value are performed for a single relay device 1 instead of each input/output module 10. Accordingly, the throughput limiting unit 115 receives feedback information regarding the throughput of other input/output modules 10 of the relay device 1 from the throughput measuring unit 122 of the same input/output module 10. The throughput limiting unit 115 then limits the throughput based on the feedback throughput information for each flow and based on the limit throughput value for each flow set for the relay device 1.

For example, when a limit throughput value of 100 Mbps is set for a flow specified by a flow number "10," and information indicating that the throughput of the flow specified by the flow number "10" of the other input/output modules 10 is 70 Mbps is fed back by the throughput measuring unit 122, the throughput limiting unit 115 limits the throughput of the flow specified by the flow number "10" to 30 Mbps which is the difference between 100 Mbps and 70 Mbps.

The transferring unit 116 is a processing unit for transferring communication packets whose throughput is limited by the throughput limiting unit 115 to the output controlling sections 12 of all of the input/output modules 10 of the relay device 1 through the BWB 20. Destinations of the communication packets transferred by the transferring unit 116 include the output controlling section 12 of the same input/output module 10.

The transfer receiving unit 121 is a processing unit for receiving communication packets transferred from the input controlling section 11 of the relay device 1 through the BWB 20. The throughput measuring unit 122 is a processing unit for measuring, for each flow, throughput of the communication packets received by the transfer receiving unit 121 except for those transferred by the input controlling section 11 of the same input/output module 10, and for feeding information regarding the measured throughput back to the throughput limiting unit 115 of the same input/output module 10.

The sorting unit 123 is a processing unit for sorting communication packets to be transmitted from this input/output module 10. More specifically, the sorting unit 123 refers to the destination information of the internal header information attached to a communication packet. If the output port of this input/output module 10 is not set as an output route, the sorting unit 123 discards the communication packet. On the other hand, if the output port of this input/output module 10 is set as the output route, the sorting unit 123 outputs the communication packet to the output route selecting unit 124.

The output route selecting unit 124 selects a communication-packet output port from the output ports 125a-125n based on the destination information of the internal header information attached to communication packets. The output route selecting unit 124 also removes the internal header information from the communication packets and transmits, from the selected port, the communication packets whose internal header information has been removed.

Figure 4:
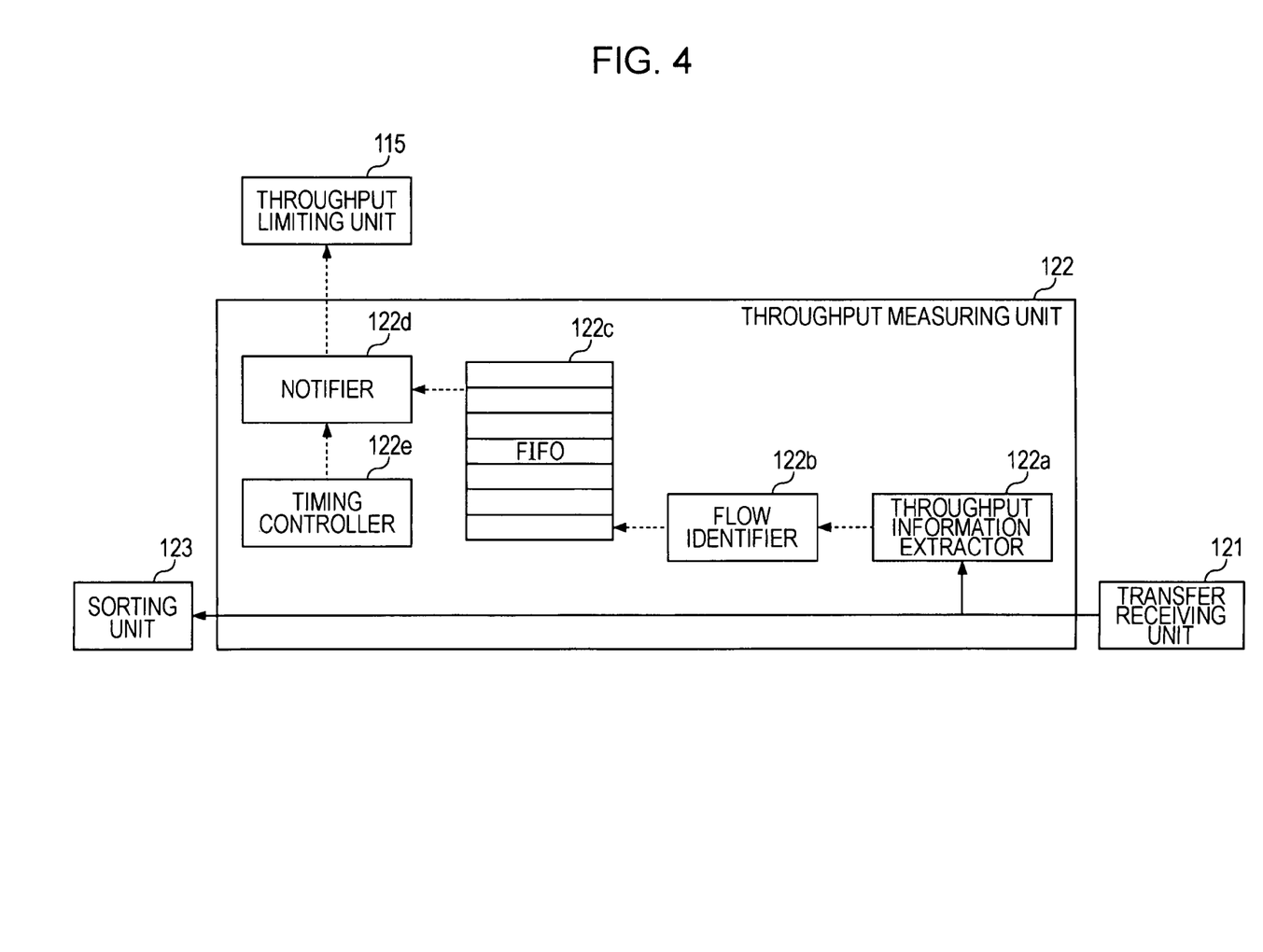
FIG. 4 is a block diagram showing a configuration of a throughput measuring unit.

Detailed configurations of the throughput measuring unit 122 and the throughput limiting unit 115 shown in FIG. 2 will now be described. FIG. 4 is a block diagram showing a configuration of the throughput measuring unit 122. As shown in the drawing, the throughput measuring unit 122 includes a throughput information extractor 122a, a flow identifier 122b, a FIFO (first in first out) 122c, a notifier 122d, and a timing controller 122e.

The throughput information extractor 122a is a processing unit for obtaining information, such as packet length information of the internal header information or the like, necessary for measurement of the throughput, and information, such as in-device class information, destination information, and input port information of the internal header information, a VLAN-ID of a VLAN tag, or the like, necessary for identification of the flow from communication packets received by the transfer receiving unit 121. The throughput information extractor 122a does not obtain information regarding communication packets transferred from the input controlling section 11 of the same input/output module 10.

The flow identifier 122b is a processing unit for identifying a flow to which communication packets belong based on the information obtained by the throughput information extractor 122a. The flow identifier 122b has a function similar to that of the flow identifying unit 114. The FIFO 122c is storage means for storing values of the packet length information and the in-device class information, obtained by the throughput information extractor 122a, in association with the flow number identified by the flow identifier 122b.

Figure 5:
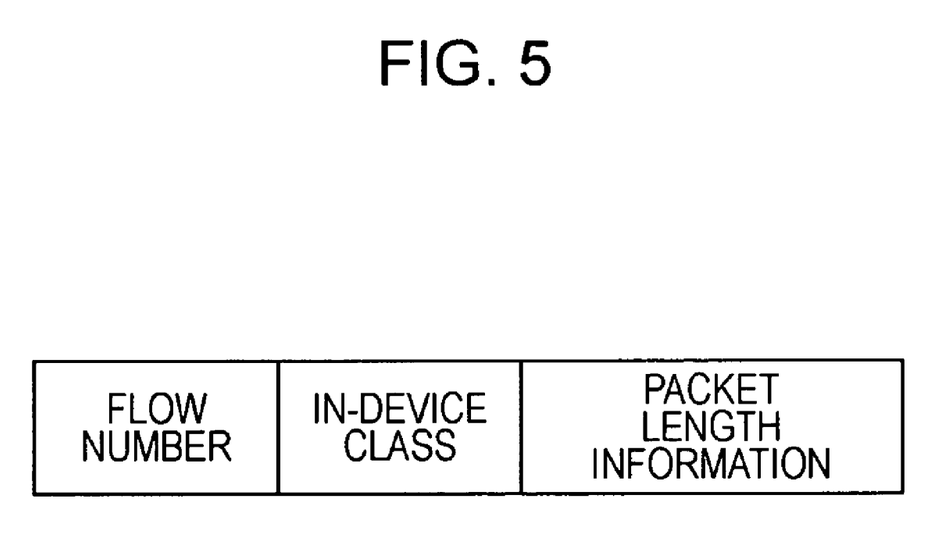
FIG. 5 is a diagram showing a structure of feedback information.

The notifier 122d is a processing unit for feeding the information stored in the FIFO 122c back to the throughput limiting unit 115 of the same input/output module 10 in a format shown in FIG. 5 at a timing specified by the timing controller 122e. The timing instructed by the timing controller 122e and the storage capacity of the FIFO 122c are adjusted so that an increase in a processing load of the throughput limiting unit 115 does not cause a processing delay.

It is assumed that an operation speed of the through limiting unit 115 is relatively low in the configuration shown in FIG. 4. If the operation speed of the throughput limiting unit 115 is high enough to receive feedback information at any time, the FIFO 122c and the timing controller 122e may be omitted. In addition, although the throughput limiting unit 115 is not notified with the information regarding the throughput of communication packets transferred from the input controlling section 11 of the same input/output module 10 in the description given above, the information limiting unit 115 may be notified with the information regarding the throughput of these packets and may subtract the throughput of these packets.

Figure 6:
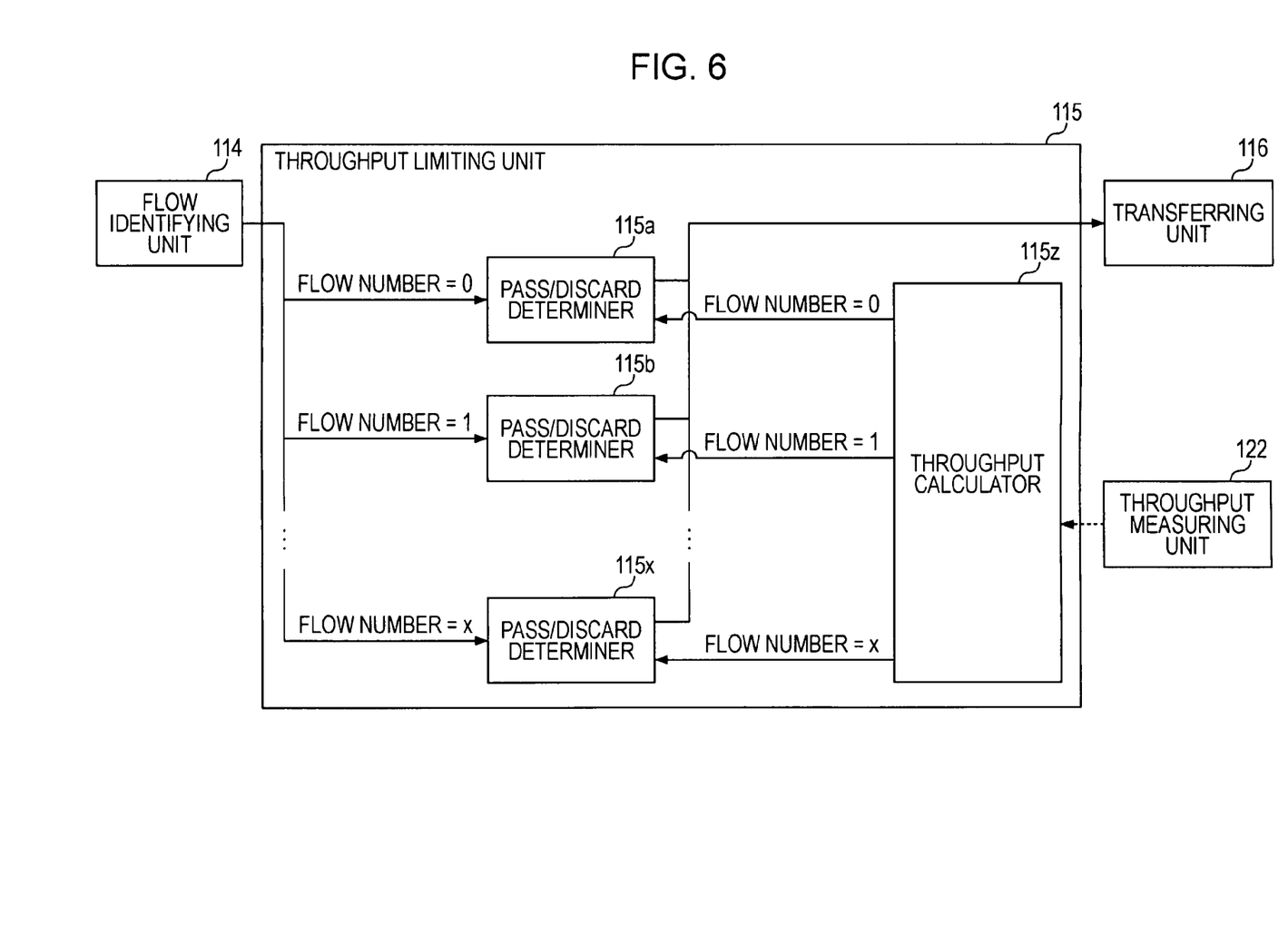
FIG. 6 is a block diagram showing a configuration of a throughput limiting unit.

FIG. 6 is a block diagram showing a configuration of the throughput limiting unit 115. As shown in the drawing, the throughput limiting unit 115 includes pass/discard determiners 115a-115x and a throughput calculator 115z. There are only as many pass/discard determiners 115a-115x as there are classifiable flows. The pass/discard determiners 115a-115x determine whether to pass communication packets belonging to a corresponding flow so that the throughput of the corresponding flow does not exceed the limit value notified by the throughput calculator 115z. The throughput calculator 115z calculates, for each flow, an upper limit of the throughput transferable within the same input/output module 10 in the relay device 1 on the basis of the information fed back from the throughput measuring unit 122 and the predetermined limit throughput of each flow. The throughput calculator 115z notifies the pass/discard determiners 115a-115x of the calculated result as a limit value.

Figure 7:
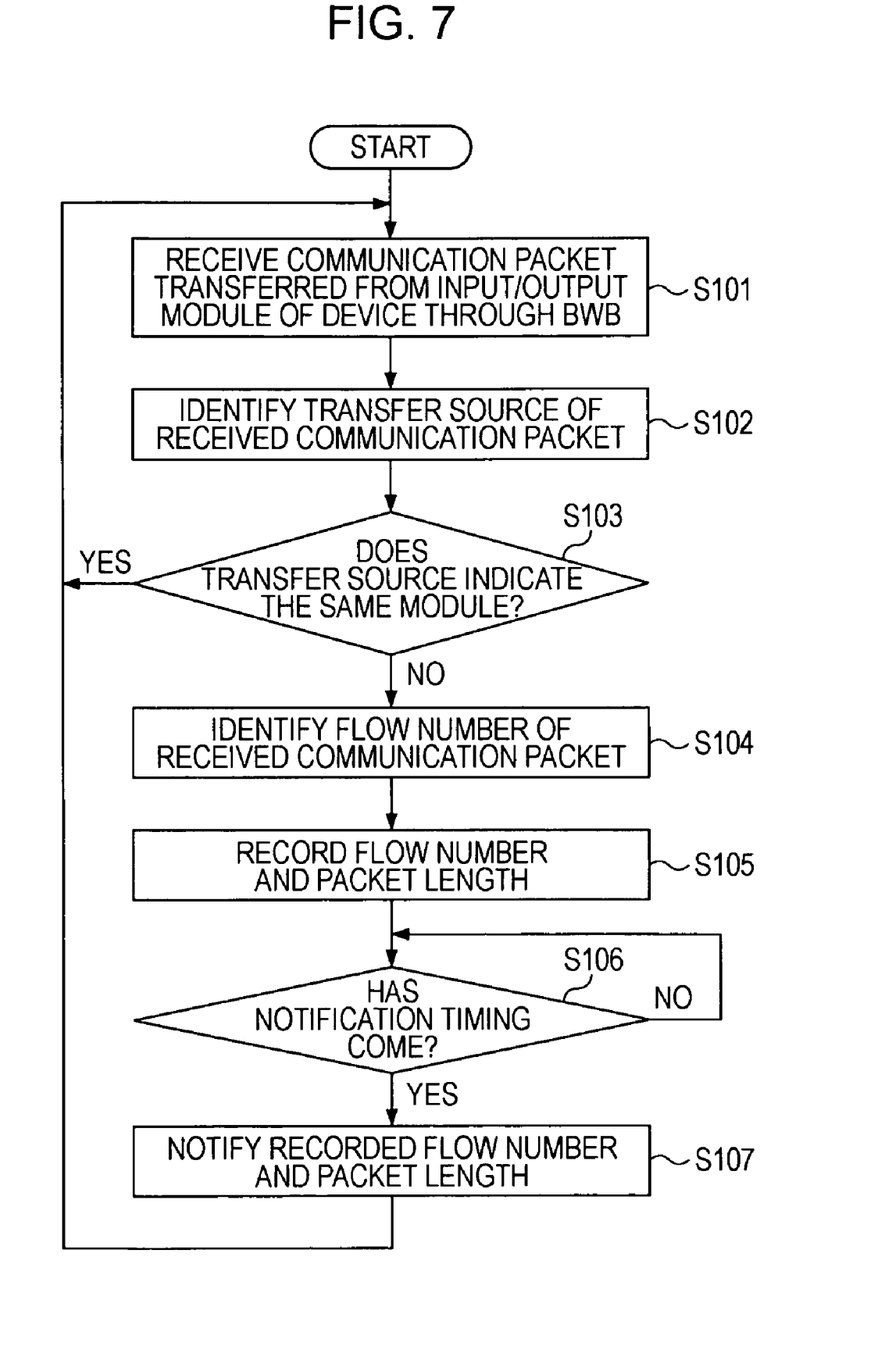
FIG. 7 is a flowchart showing a procedure of a throughput measuring operation.

A procedure of an operation executed by each input/output module 10 shown in FIG. 2 will now be described. FIG. 7 is a flowchart showing a procedure of a throughput measuring operation performed by the output controlling section 12. As shown in FIG. 7, upon the transfer receiving unit 121 receiving a communication packet transferred from the input/output module 10 of the relay device 1 through the BWB 20 (STEP S101), the throughput measuring unit 122 identifies the input controlling section 11 that transferred the received communication packet (STEP S102).

If the transfer source is the input controlling section 11 of the same input/output module 10 (YES of STEP S103), the throughput measuring unit 122 restarts the operation from STEP S101 without measuring the length of the communication packet. On the other hand, if the transfer source is not the input controlling section 11 of the same input/output module 10 (NO of STEP S103), the flow identifier 122b identifies a flow to which the communication packet belongs (STEP S104), and records information, such as the flow number and the packet length, in the FIFO 122c (STEP S105).

If the notification timing has come (YES of STEP S106), the notifier 122d feeds the information recorded in the FIFO 122c back to the throughput limiting unit 115 (STEP S107). Thereafter, the operation is restarted from STEP S101. On the other hand, if the notification timing has not come (NO of STEP S106), the operation is restarted from STEP S101 without feedback of the information to the throughput limiting unit 115.

Figure 8:
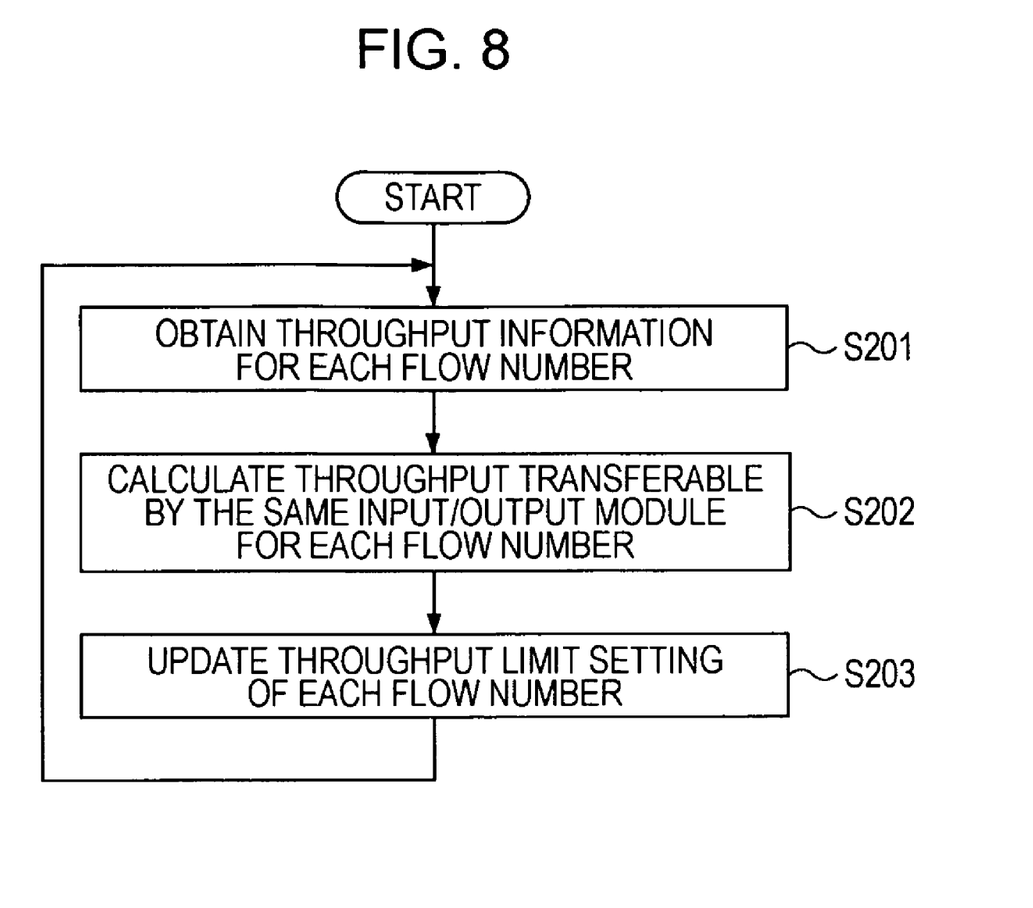
FIG. 8 is a flowchart showing a procedure of a throughput limiting operation.

FIG. 8 is a flowchart showing a procedure of a throughput limiting operation performed by the input controlling section 11. As shown in FIG. 8, upon obtaining throughput information for each flow number from the throughput measuring unit 122 (STEP S201), the throughput limiting unit 115 calculates, for each flow number, throughput transferable by the input controlling section 11 within the same input/output module 10 (STEP S202). The throughput limiting unit 115 updates a throughput limit setting for each flow number based on the calculated result (STEP S203). Such a procedure is executed repeatedly.

Meanwhile, the configuration of the relay device 1 according to the embodiment shown in FIG. 2 can be altered variously in a scope not departing from the spirit of the invention. For example, the band controlling method according to the embodiment may be combined with another band controlling method. In particular, since the band controlling method according to the embodiment is a method for limiting the throughput on an input side, a combination of the method according to the embodiment with a method for performing band control on an output side is effective.

Additionally, functions of the throughput limiting unit 115 and the throughput measuring unit 122 of the relay device 1 may be implemented as software executed by a processor, whereby functions equivalent to those of the throughput limiting unit 115 and the throughput measuring unit 122 may be realized. In this case, each input/output module 10 of the relay device 1 includes a processor, a non-volatile memory, and a random access memory (RAM) serving as a work memory connected with each other through a bus or the like.

The non-volatile memory stores a band controlling program having functions equivalent to those of the throughput limiting unit 115 and the throughput measuring unit 122. The processor reads out the band controlling program, loads the program to the RAM to create an executable state, and executes calculation of a limit throughput value for each flow using a data area of the RAM.

Meanwhile, the band controlling program does not have to be initially stored in the non-volatile memory. The program stored on a storage medium, such as a CD-ROM, may be read out and executed by the processor. In addition, the program may be stored in a computer (or a server) connected to the relay device 1 via a public line, the Internet, a local area network (LAN), a wide area network (WAN), or the like, and may be read out and executed by the processor.

As described above, in the embodiment, communication packets received by one input/output module 10 are transferred to all of the input/output modules 10 included in the relay device 1, and each of the input/output modules 10 autonomously measures and limits throughput, whereby band control is established. Since a path for transferring the communication packets between the input/output modules 10 is originally used for relaying the communication packets, and since the band controlling method according to the embodiment does not require a path for exchanging information between the input/output modules 10 except for this communication packet transferring path, the configuration of the device can be simplified.

According to this embodiment, in a relay device configured to transfer communication packets between input/output modules to relay the communication, throughput of communication packets transferred from other input/output modules is measured, and throughput to be transferred by this input/output module is limited based on the measured result. Accordingly, band control can be established with a simple configuration without providing a special path for exchanging the throughput information between the input/output modules.

Meanwhile, a method, a device, a system, a computer program, a recording medium, and a data structure to which elements of the above-described relay device, representations, or any given combinations of the elements are applied are effective to solve the above-described problems.

According to a relay device and a band controlling program disclosed in this application, band control can be advantageously realized without complication of a configuration even if a plurality of input/output modules exist.

The turn of the embodiments does not show the superiority and inferiority of the invention. Although the embodiments of the invention have been described in detail, it should be understood that the various changes, substitutions, and alterations could be made hereto without departing from the spirit and scope of the invention.

What is claimed is:

1. A relay device comprising:
a plurality of input/output modules, each of the plurality of the input/output modules comprising a transferor, a meter corresponding to the transferor, and limiter,
wherein the meter measures a throughput of communication packets transferred by a plurality of transferors of the plurality of input/output modules,
the meter feeds back information relating to the throughput to only the transferor corresponding to the meter,
the meter measures the throughput of the communication packets transferred only at the other input/output modules by measuring the throughput of the communication packets received by the transferor excluding the communication packets transferred within the same input/output module, and
the limiter adjusts transferring rate at the same input/output module by what is already being sent by the other input/output modules for a particular communication of packets.

2. The device according to claim 1, wherein the transferor transfers communication packets received by one input/output module from outside of the relay device to all of the input/output modules included in the relay device.

3. The device according to claim 1, wherein the meter measures the throughput of the communication packets for each group composed of a combination of input/output ports included in the input/output modules, and
wherein a throughput shaper limits the throughput of the communication packets for each group.

4. The device according to claim 1, wherein the meter measures the throughput of the communication packets for each network service, and
wherein a throughput shaper limits the throughput of the communication packets for each network service.

5. The relay device according to claim 1, wherein the meter measures the throughput of the communication packets for each user, and
wherein a throughput shaper limits the throughput of the communication packets for each user.

6. A bandwidth controlling method comprising:
performing bandwidth control for each input/output module in a relay device that has a plurality of input/output modules each having a transferor; and
allowing a processor arranged at the each input/output module to execute a throughput measuring operation corresponding to the transferor of measuring a throughput of communication packets transferred by a plurality of transferors of the plurality of input/output modules, wherein the throughput measuring operation feeds back information relating to the throughput to only the transferor corresponding to the throughput measuring operation, wherein
the throughput measuring operation further comprises measuring the throughput of the communication packets transferred only at the other input/output modules by measuring the throughput of the communication packets received by the transferor excluding the communication packets transferred within the same input/output module, and
a limiting operation adjusts transferring rate at the same input/output module by what is already being sent by the other input/output modules for a particular communication of packets.

7. The method according to claim 6, further comprising:
allowing the processor to execute a transferring operation of transferring communication packets received by one input/output module from outside of the relay device to all of the input/output modules included in the relay device.

8. The method according to claim 6, wherein, at the throughput measuring operation, the throughput of the communication packets is measured for each group composed of a combination of input/output ports included in the input/output modules, and
wherein, at a throughput limiting operation, the throughput of the communication packets is limited for each group.

9. The method according to claim 6, wherein, at the throughput measuring operation, the throughput of the communication packets is measured for each network service, and
wherein, at a throughput limiting operation, the throughput of the communication packets is limited for each network service.

10. The method according to claim 6, wherein, at the throughput measuring operation, the throughput of the communication packets is measured for each user, and
wherein, at a throughput limiting operation, the throughput of the communication packets is limited for each user.

* * * * *